United States Patent
Nakamura et al.

(10) Patent No.: US 10,730,771 B2
(45) Date of Patent: Aug. 4, 2020

(54) METHOD FOR OPERATING REVERSE-OSMOSIS MEMBRANE TREATMENT SYSTEM

(71) Applicant: KURITA WATER INDUSTRIES LTD., Tokyo (JP)

(72) Inventors: Taeko Nakamura, Tokyo (JP); Kenji Kowata, Tokyo (JP); Yoshihiko Endo, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 152 days.

(21) Appl. No.: 15/559,668

(22) PCT Filed: Mar. 24, 2016

(86) PCT No.: PCT/JP2016/059292
§ 371 (c)(1),
(2) Date: Sep. 19, 2017

(87) PCT Pub. No.: WO2016/158633
PCT Pub. Date: Oct. 6, 2016

(65) Prior Publication Data
US 2018/0282186 A1  Oct. 4, 2018

(30) Foreign Application Priority Data
Mar. 31, 2015  (JP) .................. 2015-072956

(51) Int. Cl.
*C02F 1/76* (2006.01)
*B01D 61/06* (2006.01)
(Continued)

(52) U.S. Cl.
CPC ............. *C02F 1/766* (2013.01); *B01D 61/06* (2013.01); *B01D 61/12* (2013.01); *B01D 65/08* (2013.01);
(Continued)

(58) Field of Classification Search
None
See application file for complete search history.

(56) References Cited

U.S. PATENT DOCUMENTS 9,700,847 B2   7/2017   Hirao et al.
10,086,335 B2   10/2018   Liu et al.
(Continued)

FOREIGN PATENT DOCUMENTS

EP   2554050 A1   2/2013
JP   H01-115412 A   5/1989
(Continued)

OTHER PUBLICATIONS

PCT/ISA/210, "International Search Report for International Application No. PCT/JP2016/059292," dated Jun. 7, 2016.
(Continued)

*Primary Examiner* — Krishnan S Menon
(74) *Attorney, Agent, or Firm* — Manabu Kanesaka

(57) ABSTRACT

Provided is a method for operating an RO-membrane treatment system that includes an energy recovery device that recovers energy from the concentrate of an RO-membrane device and the RO-membrane treatment system that reduce the occurrence of biofouling in not only the RO-membrane device but also the energy recovery device in order to increase the energy efficiency of the entire system and operate the RO-membrane treatment system with consistency. The method includes adding at least one slime-control agent selected from a combined-chlorine slime-control agent and a stabilized-bromine slime-control agent to water that is to be treated with the reverse-osmosis-membrane device such that a residual halogen concentration in the concentrate that is to be introduced into the energy recovery device is 0.1 to 10000 mg/L as total chlorine.

6 Claims, 2 Drawing Sheets

(51) Int. Cl.
  *B01D 61/12* (2006.01)
  *C02F 1/44* (2006.01)
  *B01D 65/08* (2006.01)
  *B01D 61/04* (2006.01)
  *C02F 103/08* (2006.01)

(52) U.S. Cl.
  CPC ............... *C02F 1/44* (2013.01); *C02F 1/441* (2013.01); *C02F 1/76* (2013.01); *B01D 61/04* (2013.01); *B01D 2311/12* (2013.01); *B01D 2313/246* (2013.01); *B01D 2321/162* (2013.01); *B01D 2321/168* (2013.01); *C02F 2103/08* (2013.01); *C02F 2303/10* (2013.01); *C02F 2303/20* (2013.01); *Y02W 10/30* (2015.05)

(56) References Cited

U.S. PATENT DOCUMENTS

| | | | |
|---|---|---|---|
| 2006/0032823 A1* | 2/2006 | Harrison | A61L 2/18 210/754 |
| 2007/0138096 A1* | 6/2007 | Tarr | B01D 61/022 210/650 |
| 2012/0168378 A1 | 7/2012 | Taniguchi et al. | |
| 2014/0124442 A1 | 5/2014 | Nakamura et al. | |

FOREIGN PATENT DOCUMENTS

| | | | |
|---|---|---|---|
| JP | 2006-263510 A | | 10/2006 |
| JP | 2006263510 A | * | 10/2006 |
| JP | 2010-201313 A | | 9/2010 |
| JP | 2014-176799 A | | 9/2014 |
| JP | 2014-188473 A | | 10/2014 |
| JP | 2015-072956 | | 3/2015 |
| JP | 2015-062889 A | | 4/2015 |
| JP | 2016-538119 A | | 12/2016 |
| WO | 2011/030589 A1 | | 3/2011 |
| WO | 2011/125764 A1 | | 10/2011 |
| WO | 2013/005787 A1 | | 1/2013 |
| WO | 2014/058041 A1 | | 4/2014 |
| WO | 2015/073170 A1 | | 5/2015 |

OTHER PUBLICATIONS

Europe Patent Office, "Search Report for European Patent Application No. 16772514.2," dated Nov. 13, 2018.
Japan Patent Office, "Notification of Reason for Cancellation for Japanese Patent No. 5967337," dated Apr. 14, 2017.
Japan Patent Office, "Reason for Opposition for Japanese Patent No. 5967337," dated Feb. 9, 2017.
Goto, A., "A Next-Generation Isobaric Energy Recovery Device," MEMBRANE, 2015, p. 73-79, vol. 40, No. 2.

* cited by examiner

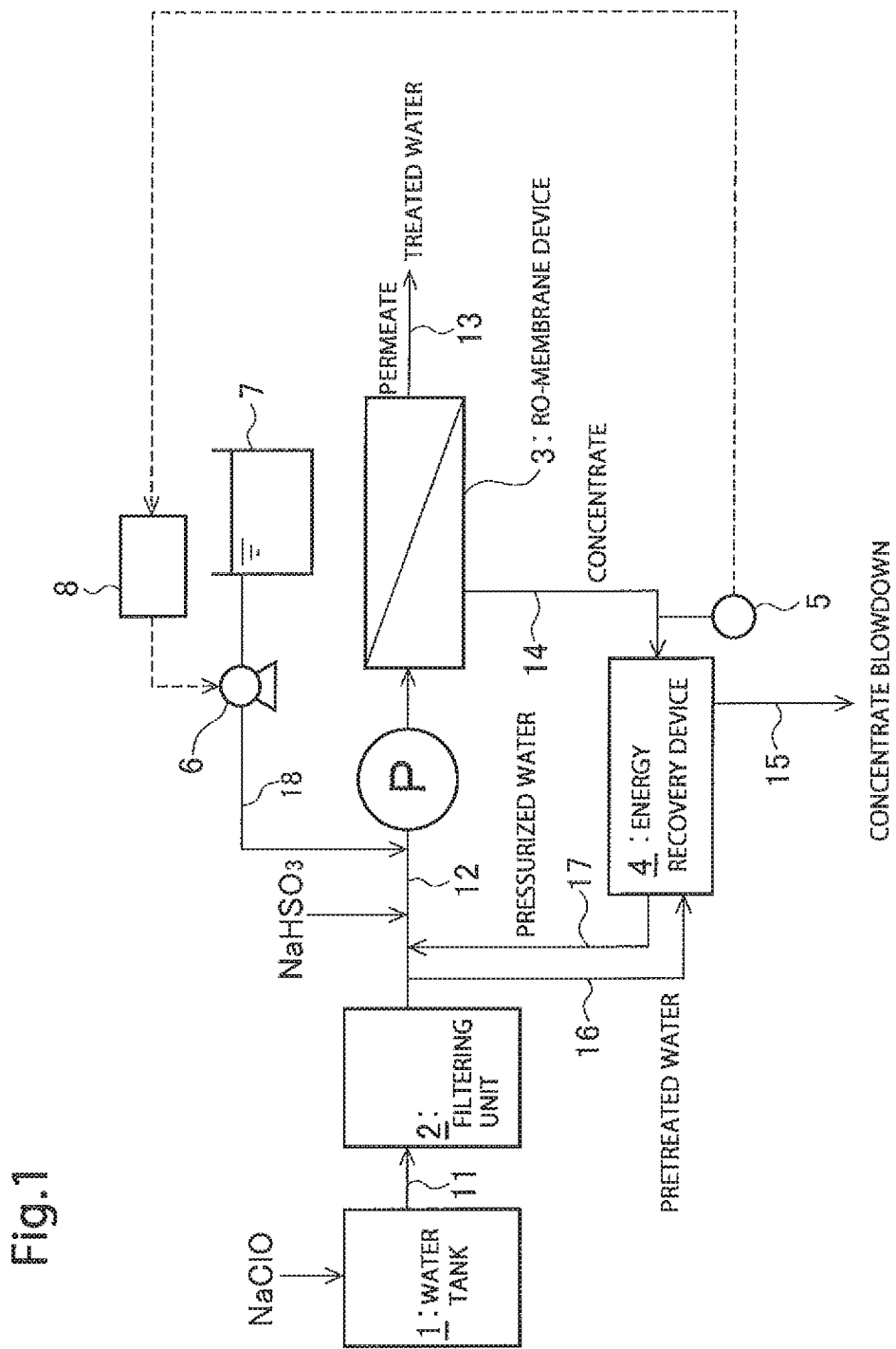

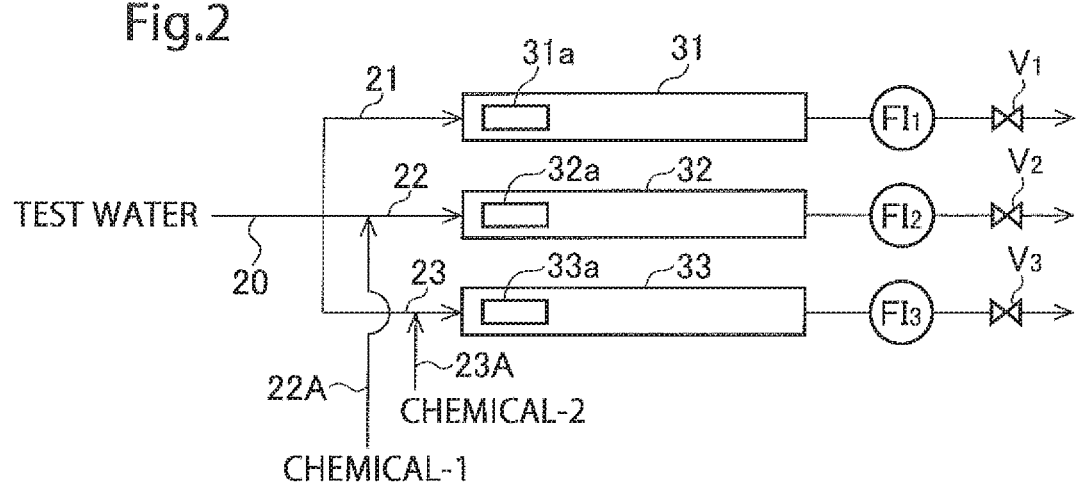

METHOD FOR OPERATING REVERSE-OSMOSIS MEMBRANE TREATMENT SYSTEM

TECHNICAL FIELD

The present invention relates to a method for operating a reverse-osmosis-membrane treatment system that includes a reverse-osmosis-membrane device and an energy recovery device into which the concentrate of the reverse-osmosis-membrane device is introduced and to the reverse-osmosis-membrane treatment system. The present invention relates specifically to a method for operating a reverse-osmosis-membrane treatment system and a reverse-osmosis-membrane treatment system that reduce the occurrence of biofouling in the reverse-osmosis-membrane device and the energy recovery device in order to increase water production capacity and energy recovery rate and operate the reverse-osmosis-membrane treatment system with consistency.

BACKGROUND ART

A known example of seawater desalination systems is a seawater desalination system that desalinates seawater by passing the seawater through a reverse-osmosis-membrane device (RO-membrane device). In the seawater desalination system, about 1 to 3 mg-$Cl_2$/L of sodium hypochlorite (NaClO) for sterilization is added to seawater. The water is subjected to a dust-removal treatment and subsequently to a pretreatment, in which coagulation is performed by adding an iron inorganic coagulant to the water and filtration is then performed. The pretreated water is pressurized with a high-pressure pump and pressure-fed to the RO-membrane device. The permeate of the RO membrane is drawn as fresh water from which salt has been removed. The concentrate (brine) containing a high concentration of salt is blown down. In order to reduce the degradation of an RO membrane caused by NaClO, sodium bisulfite ($NaHSO_3$) is added to the water on the entry side of the high-pressure pump for removing residual chlorine by reduction and performing an intermittent sterilization treatment. Sulfuric acid is also used for reducing the formation of scale and performing an intermittent sterilization treatment (NPL 1).

Most of the electric power consumed in a seawater desalination plant is used for increasing the pressure with the high-pressure pump. Accordingly, seawater desalination plants include an energy recovery device that recovers energy from the high-pressure concentrate discharged from the RO-membrane device. Examples of the energy recovery device include an energy recovery device that recovers energy from the concentrate by converting the pressure of the concentrate into electric power and an energy recovery device that recovers energy from the concentrate and reuses the energy for pressurization, that is, for pressurizing, with the pressure of the concentrate, the seawater that has been treated with a pretreatment (NPL 1 and NPL 2).

Free-chlorine oxidizing agents, such as NaClO, which have been commonly used for reducing the occurrence of biofouling of RO membranes, cause the oxidation degradation of RO membranes. In order to prevent the oxidation degradation of RO membranes, combined-chlorine slime-control agents, such as chlorosulfamic acid, and stabilized-bromine slime-control agents, such as bromosulfamic acid, have been proposed (PTL 1, PTL 2, and PTL 3).

In the case where a free-chlorine oxidizing agent, such as NaClO, is used, a residual portion of the free-chlorine oxidizing agent is removed by reduction using a reductant such as $NaHSO_3$ on the entry side of an RO-membrane device in order to prevent the oxidation degradation of RO membranes.

Combined-chlorine slime-control agents and stabilized-bromine slime-control agents are used such that a small amount of residual chlorine can be detected on the entry side of an RO-membrane device, since they do not degrade RO membranes. For example, it is described in PTL 1 that it is preferable to use a chlorosulfamate oxidizing agent, which is a combined-chlorine slime-control agent, such that the concentration of the oxidizing agent in the water fed into an RO-membrane device (hereafter, the water to be introduced into and treated with an RO-membrane device is referred to as "RO feedwater") is 0.1 to 1000 mg/L or, particularly preferably, 1 to 200 mg/L. It is described in PTL 2 that a combined chlorine agent is used such that the total chlorine concentration in the RO feedwater is 1 to 5 mg/L or preferably 1 to 3 mg/L and the free chlorine concentration in the RO feedwater is 0.1 mg/L or less or preferably 0.05 mg/L or less. It is described in PTL 3 that the concentration of available halogen that comes into contact with a separation membrane is preferably 0.01 to 100 mg/L as available chlorine. It is also described that, if the above available halogen concentration is lower than 0.01 mg/L, the formation of slime may fail to be suppressed to a sufficient degree and that, if the above available halogen concentration is higher than 100 mg/L, the degradation of the separation membrane or the corrosion of pipes or the like may occur.

In an RO-membrane treatment system including an energy recovery device that recovers energy from the concentrate of an RO-membrane device, removing residual chlorine by reduction using a reductant, such as $NaHSO_3$, on the entry side of the RO-membrane device subsequent to the addition of a free-chlorine oxidizing agent, such as NaClO, may result in the occurrence of biofouling in the RO-membrane device and the energy recovery device, because residual chlorine, which is effective for sterilization, is not present downstream of the RO-membrane device.

In the case where a combined-chlorine slime-control agent or a stabilized-bromine slime-control agent is used, it is not necessary to remove residual halogen on the entry side of an RO-membrane device, and RO feedwater that contains residual halogen resulting from the combined-chlorine slime-control agent or the stabilized-bromine slime-control agent is introduced into the RO-membrane device. This reduces the occurrence of biofouling in the RO-membrane device, but may result in the occurrence of biofouling in the energy recovery device, into which the concentrate of the RO-membrane device is introduced.

Specifically, although a slime-control agent added to the RO feedwater is concentrated in the RO-membrane device and, in theory, the concentration of the slime-control agent in the concentrate is increased with the water recovery rate of the RO-membrane device, the combined-chlorine slime-control agent or stabilized-bromine slime-control agent becomes decomposed by organic substances deposited on the surface of an RO membrane, organic substances contained in the feedwater, organic substances adhered to a feedwater pipe or a concentrate pipe, and a reductant, such as $NaHSO_3$, that remains in the feedwater, while the water discharged on the raw-water side of the RO-membrane device is introduced into the energy recovery device through the concentrate pipe. As a result, even when the concentration of residual halogen resulting from the combined-chlorine slime-control agent or the stabilized-bromine slime-control agent in the RO feedwater is detected, it may not be possible to detect the residual halogen concentration in the concentrate that is to be introduced into the energy recovery device and to achieve the slime control effect. In such a case, biofouling may occur in the energy recovery device.

If biofouling occurs in the energy recovery device, the concentrate inlet of the energy recovery device becomes clogged. This reduces the energy recovery rate and also incurs the need to frequently stop the operation of the energy recovery device for maintenance in order to unclog the concentrate inlet.

PTL 1: JP 2010-201313 A
PTL 2: WO2011/125764
PTL 3: JP 2015-62889 A
NPL 1: Zousui Gijyutsu Handbook (Handbook of Water Re-use Technology) 2004 (Published on November 25, Heisei 16 (2004), Water Re-use Promotion Center), pp. 408-414
NPL 2: Water Re-use Technology—All About Water Treatment (published on May 10, Showa 58 (1983), Water Re-use Promotion Center)

SUMMARY OF INVENTION

An object of the present invention is to provide a method for operating an RO-membrane treatment system that includes an energy recovery device that recovers energy from the concentrate of an RO-membrane device and the RO-membrane treatment system that reduce the occurrence of biofouling in not only the RO-membrane device but also the energy recovery device in order to increase the energy efficiency of the entire system and operate the RO-membrane treatment system with consistency.

The inventor of the present invention found that it is possible to reduce the occurrence of biofouling in both RO-membrane device and energy recovery device by adding at least one slime-control agent (hereafter, may be referred to as "stabilized-halogen slime-control agent") selected from a combined-chlorine slime-control agent and a stabilized-bromine slime-control agent to the RO feedwater such that the concentration of residual halogen in the concentrate that is to be introduced into the energy recovery device falls within the predetermined concentration range as total chlorine.

The summary of the present invention is as follows.

[1] A method for operating a reverse-osmosis-membrane treatment system including a reverse-osmosis-membrane device and an energy recovery device into which a concentrate of the reverse-osmosis-membrane device is introduced, the method comprising adding at least one slime-control agent selected from a combined-chlorine slime-control agent and a stabilized-bromine slime-control agent to water that is to be treated with the reverse-osmosis-membrane device such that a residual halogen concentration in the concentrate that is to be introduced into the energy recovery device is 0.1 to 10000 mg/L as total chlorine.

[2] The method for operating a reverse-osmosis-membrane treatment system according to [1], wherein the slime-control agent is at least one slime-control agent selected from a chlorosulfamate slime-control agent and a bromosulfamate slime-control agent.

[3] The method for operating a reverse-osmosis-membrane treatment system according to [1] or [2], wherein the reverse-osmosis-membrane treatment system is a reverse-osmosis-membrane treatment system for desalination of seawater.

[4] A reverse-osmosis-membrane treatment system comprising a reverse-osmosis-membrane device; an energy recovery device into which a concentrate of the reverse-osmosis-membrane device is introduced; a chemical injection unit with which at least one slime-control agent selected from a combined-chlorine slime-control agent and a stabilized-bromine slime-control agent is added to water that is to be treated with the reverse-osmosis-membrane device; a residual-halogen-concentration measuring unit with which a residual halogen concentration in the concentrate that is to be introduced into the energy recovery device is measured; and a control unit with which the amount of slime-control agent added with the chemical injection unit is controlled on the basis of the residual halogen concentration measured with the residual-halogen-concentration measuring unit.

[5] The reverse-osmosis-membrane treatment system according to [4], wherein the slime-control agent is at least one slime-control agent selected from a chlorosulfamate slime-control agent and a bromosulfamate slime-control agent, and wherein the amount of slime-control agent added with the chemical injection unit is controlled with the control unit such that the residual halogen concentration measured with the residual-halogen-concentration measuring unit is 0.1 to 10000 mg/L as total chlorine.

[6] The reverse-osmosis-membrane treatment system according to [4] or [5], the reverse-osmosis-membrane treatment system being a reverse-osmosis-membrane treatment system for desalination of seawater.

Advantageous Effects of Invention

In the present invention, at least one slime-control agent selected from a combined-chlorine slime-control agent and a stabilized-bromine slime-control agent is used. This reduces the degradation of an RO membrane included in the RO-membrane device, enables a suitable slime control effect to be achieved and, consequently, reduces the occurrence of biofouling in the RO-membrane device. As a result, the operating efficiency of the RO-membrane device may be increased, which makes it possible to produce a large amount of water with consistency.

In the present invention, the amount of slime-control agent added to the RO feedwater is controlled on the basis of the concentration of residual halogen in the concentrate of the RO-membrane device which is to be introduced into the energy recovery device and the slime-control agent is added to the RO feedwater such that the above residual halogen concentration falls within the predetermined range. This makes it possible to achieve a suitable slime control effect also in the energy recovery device.

Consequently, it becomes possible to reduce the occurrence of biofouling in the energy recovery device and increase the energy recovery rate of the energy recovery device. In addition, the frequency at which the energy recovery device is stopped for maintenance can be reduced. That is, it becomes possible to continuously operate the energy recovery device with consistency over a long period of time.

According to the present invention, it becomes possible to markedly increase the energy efficiency of the entire system that includes the RO-membrane device and the energy recovery device.

BRIEF DESCRIPTION OF DRAWINGS

FIG. 1 is a system diagram illustrating an example of a reverse-osmosis-membrane treatment system according to an embodiment of the present invention.

FIG. 2 is a system diagram illustrating a testing apparatus used in Test example I.

DESCRIPTION OF EMBODIMENTS

An embodiment of the present invention is described below in detail.

In the present invention, the amounts of free chlorine, combined chlorine, and total chlorine are determined in terms of $Cl_2$ concentration by the DPD method described in JIS K0400-33-10:1999, in which N,N-diethyl-1,4-phenylenediamine is used. Free chlorine is a type of chlorine present in the form of hypochlorous acid, hypochlorite ions, or dissolved chlorine. Combined chlorine is a type of chlorine present in the form of chloramine or organic chloramine. Total chlorine refers to types of chlorine that are present in the form of free chlorine or combined chlorine or in the form of both free chlorine and combined chlorine.

Free-chlorine agents are agents used for producing the free chlorine. Examples of active free-chlorine agents include elemental chlorine and hypochlorous acid. Examples of potential free-chlorine agents include a hypochlorite. Specific examples of the free-chlorine agent include a chlorine gas; hypochlorous acid and the salts thereof; chlorous acid and the salts thereof; chloric acid and the salts thereof; perchloric acid and the salts thereof; and chlorinated isocyanuric acid and the salts thereof. Examples of the forms of the salts include salts of alkali metals, such as sodium and potassium; salts of alkaline-earth metals, such as barium; salts of the other metals, such as nickel; and an ammonium salt.

Combined chlorine agents are chemicals used for producing the combined chlorine. Chloramines are chlorine derivatives of ammonia which are produced by the substitution of one, two, or three hydrogen atoms with chlorine atoms (monochloramine ($NH_2Cl$), dichloramine ($NHCl_2$), and nitrogen trichloride ($NCl_3$)) and all organic nitrogen compounds that can be determined by the above JIS standard. Sulfamic acid is one of the chlorine derivatives.

The combined-chlorine slime-control agent used in the present invention is a compound produced by bonding the free chlorine to a nitrogen compound, such as ammonia, an ammonia compound, melamine, urea, acetamide, sulfamide, cyclamic acid, sulfamic acid, toluenesulfonamide, succinimide, phthalic imide, isocyanuric acid, N-chlorotoluenesulfonamide, uric acid, saccharin, or a salt of any one of the above compounds.

Examples of the combined-chlorine slime-control agent include chloramine; a combined chlorine agent containing the free-chlorine agent and a sulfamic acid compound; chloramine-T (N-chloro-4-methylbenzenesulfonamide sodium salt); chloramine-B (N-chloro-benzenesulfonamide sodium salt); N-chloro-paranitrobenzenesulfonamide sodium salt; trichloromelamine; mono- or di-chloromelamine sodium salt or potassium salt; trichloro-isocyanurate; mono- or di-chloroisocyanuric acid sodium salt or potassium salt; mono- or di-chlorosulfamic acid sodium salt or potassium salt; and monochlorohydantoin, 1,3-dichlorohydantoin, and 5,5-alkyl derivatives thereof.

Among the above combined-chlorine slime-control agents, it is preferable to use the free-chlorine agent and a sulfamic acid compound in combination or a combined chlorine agent containing the free-chlorine agent and a sulfamic acid compound (hereafter, such a combined chlorine agent may be referred to as "chlorosulfamate slime-control agent").

The chlorosulfamate slime-control agent (combined-chlorine oxidizing agent containing a sulfamic acid compound) is described below.

The chlorosulfamate slime-control agent, which is preferably used as a combined-chlorine slime-control agent in the present invention, includes the free-chlorine agent and a sulfamic acid compound, or includes a combined chlorine agent containing the free-chlorine agent and a sulfamic acid compound.

When the free-chlorine agent and a sulfamic acid compound are added to the RO feedwater, a chlorosulfamate, which serves as a stable combined chlorine agent, is formed in the water. This combined chlorine agent enables the free chlorine concentration in the water to be maintained at a consistent level and thereby makes it possible to achieve slime control without degrading an RO membrane.

Specifically, the use of a sulfamic acid compound enhances the stability of the oxidizing agent against pH compared with cases where chloramines (e.g., monochloramine, dichloramine, trichloramine, and chloramine-T) are used. Furthermore, since the above slime-control agent is primarily composed of combined chlorine, the degradation of the membrane may be minimized.

Examples of the free-chlorine agent used in the present invention include, but are not limited to, a chlorine gas; chlorine dioxide; hypochlorous acid and salts thereof; chlorous acid and salts thereof; chloric acid and salts thereof; perchloric acid and salts thereof; and chlorinated isocyanuric acid and salts thereof. Specific examples of the forms of the above salts include alkali metal salts of hypochlorous acid, such as sodium hypochlorite and potassium hypochlorite; alkaline-earth metal salts of hypochlorous acid, such as calcium hypochlorite and barium hypochlorite; alkali metal salts of chlorous acid, such as sodium chlorite and potassium chlorite; alkaline-earth metal salts of chlorous acid, such as barium chlorite; salts of chlorous acid with the other metals, such as nickel chlorite; alkali metal salts of chloric acid, such as ammonium chlorate, sodium chlorate, and potassium chlorate; and alkaline-earth metal salts of chloric acid, such as calcium chlorate and barium chlorate. The above chlorine oxidizing agents may be used alone or in combination of two or more. Among the above chlorine oxidizing agents, hypochlorites are suitably used because of ease of handling.

Examples of the sulfamic acid compound used in the present invention include the compound represented by General Formula [I] below and salts thereof.

[Chem. 1]

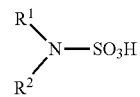

[I]

In General Formula [I], $R^1$ and $R^2$ each independently represent a hydrogen atom or a hydrocarbon group including 1 to 8 carbon atoms.

Examples of the sulfamic acid compound include a sulfamic acid, which is represented by General Formula [I] with $R^1$ and $R^2$ being hydrogen atoms, N-methylsulfamic acid, N,N-dimethylsulfamic acid, and N-phenylsulfamic acid.

Examples of the forms of salts of the sulfamic acid compound include alkali metals salts, such as a sodium salt and a potassium salt; alkaline-earth metal salts, such as a calcium salt, a strontium salt, and a barium salt; salts of the other metals, such as a manganese salt, a copper salt, a zinc salt, an iron salt, a cobalt salt, and a nickel salt; and an ammonium salt and a guanidine salt. Specific examples of the salts of the sulfamic acid compound include sodium sulfamate, potassium sulfamate, calcium sulfamate, strontium sulfamate, barium sulfamate, iron sulfamate, and zinc sulfamate.

Sulfamic acid and the above sulfamates may be used alone or in combination of two or more.

When the free-chlorine agent, such as a hypochlorite, is mixed with the sulfamic acid compound, such as a sulfamate, they react with each other to form a stable chlorosulfamate, which enables the free chlorine concentration in the water to be maintained at a consistent level without causing a change in the degree of dissociation with pH which may occur in the case where chloramine is used and the consequent fluctuations in free chlorine concentration.

Although the ratio between the amounts of free-chlorine agent and sulfamic acid compound used in the present invention is not limited, the amount of sulfamic acid compound used per mole of available chlorine included in the free-chlorine agent is preferably 0.5 to 5.0 moles and is more preferably 0.5 to 2.0 moles.

Although the chlorosulfamate slime-control agent is suitably used in the form of an aqueous solution containing the free-chlorine agent and the sulfamic acid compound, the form of the chlorosulfamate slime-control agent is not limited to the mixed aqueous solution described above. The free-chlorine agent and the sulfamic acid compound may be provided separately.

The chlorosulfamate slime-control agent may optionally include a constituent other than the free-chlorine agent or the sulfamic acid compound such that the advantageous effects of the chlorosulfamate slime-control agent are not impaired. Examples of the other constituent include an alkali chemical, an azole, an anionic polymer, and a phosphonic acid.

The alkali chemical is used for stabilizing the free-chlorine agent included in the chlorosulfamate slime-control agent. Typical examples of the alkali chemical include sodium hydroxide and potassium hydroxide.

The azole is an aromatic compound including a five-member ring having two or more hetero atoms. Examples of the azole used in the present invention include monocyclic azole compounds, such as imidazole, pyrazole, oxazole, thiazole, triazole, and tetrazole; fused polycyclic azole compounds, such as benzimidazole, benzoxazole, benzisoxazole, benzothiazole, mercaptobenzimidazole, mercaptomethylbenzimidazole, mercaptobenzothiazole, benzotriazole, tolyltriazole, indazole, purine, imidazothiazole, and pyrazoloxazole; and salts of the above azole compounds that are capable of forming a salt. The above azole compounds may be used alone or in combination of two or more.

The weight-average molecular weight of the anionic polymer is preferably 500 to 50,000, is more preferably 1,000 to 30,000, and is further preferably 1,500 to 20,000.

Examples of monomers that constitute the anionic polymer include acrylic acid, methacrylic acid, maleic acid, and salts of these unsaturated carboxylic acids. Examples of the forms of salts of the unsaturated carboxylic acids include alkali metal salts, such as a sodium salt and a potassium salt; alkaline-earth metal salts, such as a calcium salt and a magnesium salt; and anhydrides of the unsaturated carboxylic acids, such as maleic anhydride. The above monomers may be polymerized alone, or two or more monomers selected from the above monomers may be copolymerized with one another. In another case, one or more monomers selected from the above monomers may be copolymerized with one or more copolymerizable monomers other than the above monomers. Examples of the other copolymerizable monomers include unsaturated alcohols, unsaturated carboxylic acid esters, alkenes, and monomers including a sulfonic group. Examples of the unsaturated alcohols include allyl alcohol and methallyl alcohol. Examples of the unsaturated carboxylic acid esters include methyl acrylate, ethyl acrylate, hydroxyethyl acrylate, and hydroxyethyl methacrylate. Examples of the alkenes include isobutylene, n-butylene, diisobutylene, and pentene. Examples of the monomers including a sulfonic group include vinylsulfonic acid, 2-hydroxy-3-allyloxy-1-propanesulfonic acid, isoprenesulfonic acid, and styrenesulfonic acid.

Examples of the anionic polymer that can be used in the present invention include polymaleic acid; polyacrylic acid; a copolymer of acrylic acid with 2-hydroxy-3-allyloxypropanesulfonic acid; a copolymer of acrylic acid with 2-acrylamido-2-methylpropanesulfonic acid; a copolymer of acrylic acid with isoprenesulfonic acid; a copolymer of acrylic acid with 2-hydroxyethyl methacrylate; a copolymer of acrylic acid with 2-hydroxyethyl methacrylate and isopropylenesulfonic acid; a copolymer of maleic acid with pentene; and alkali metal salts and alkaline-earth metal salts of the above anionic polymers.

Examples of the phosphonic acid include 1-hydroxyethylidene-1,1-diphosphonic acid, 2-phosphonobutane-1,2,4-tricarboxylic acid, hydroxyphosphonoacetic acid, nitrilotrimethylenephosphonic acid, ethylenediamine-N,N,N',N'-tetramethylenephosphonic acid, and salts of the above phosphonic acids. In the present invention, the phosphonic acid may be used in the form of free acid or salt. Examples of the forms of salts of the phosphonic acid include alkali metal salts, such as a lithium salt, a sodium salt, and a potassium salt; and alkaline-earth metal salts, such as a magnesium salt and a calcium salt. The salts of the phosphonic acid may be a normal salt from which all hydrogen atoms, which are the acidic components, are removed by substitution or an acidic salt in which some of the hydrogen atoms remain. The above phosphonic acids and the salts thereof may be used alone or in combination of two or more.

In the case where the chlorosulfamate slime-control agent includes the other constituents described above, the form of the chlorosulfamate slime-control agent is not limited. For example, the chlorosulfamate slime-control agent may be provided in the form of one-component chemical that includes the free-chlorine agent, the sulfamic acid compound, and one or more constituent selected from the azole, the anionic polymer, and the phosphonic acid or in the form of two-component chemical constituted by two liquids each including different constituents selected from the above constituents. An example of the two-component chemical is a two-component chemical constituted by Liquid A that contains the free-chlorine agent and the sulfamic acid compound and Liquid B that contains the other constituents.

In the case where the chlorosulfamate slime-control agent is provided in the form of one-component chemical, the pH of the slime-control agent is preferably adjusted to be 12 or more and is more preferably adjusted to be 13 or more, that is, for example, 13 to 14, by adding an alkali, such as sodium hydroxide or potassium hydroxide, to the slime-control agent in order to maintain the stability of the free-chlorine agent. In the case where the chlorosulfamate slime-control agent is provided in the form of two-component chemical, similarly, the pH of the chemical that contains the free-chlorine agent is preferably adjusted to be 12 or more and is more preferably adjusted to be 13 or more, that is, for example, 13 to 14.

The chlorosulfamate slime-control agent used in the present invention may have, for example, the following compositions.

(A) An aqueous solution having a pH of 12 or more which contains, as available chlorine, 1% to 8% by weight or preferably 3% to 6% by weight free-chlorine agent and 1.5% to 9% by weight or preferably 4.5% to 8% by weight sulfamic acid compound.

(B) An aqueous solution having a pH of 12 or more which contains, in addition to the constituents of (A) above, one or more constituents selected from 0.05% to 3.0% by weight azole, 1.5% to 3.0% by weight anionic polymer, and 0.5% to 4.0% by weight phosphonic acid.

In (A) and (B), the pH of the aqueous solution may be adjusted by adding an alkali chemical to the aqueous solution.

The stabilized-bromine slime-control agent is described below.

The stabilized-bromine slime-control agent used in the present invention is a compound produced by reacting a nitrogen compound, such as ammonia, an ammonia compound, melamine, urea, acetamide, sulfamide, cyclamic acid, sulfamic acid, toluenesulfonamide, succinimide, phthalic imide, isocyanuric acid, N-chlorotoluenesulfonamide, uric acid, saccharin, or a salt of any one of the above compounds, with a bromine oxidizing agent.

Examples of the bromine oxidizing agent include bromine (liquid bromine); compounds such as bromine chloride, hypobromous acid, bromic acid, and a bromate; and compounds produced by reacting the bromine compounds with the free-chlorine agent.

Examples of the bromine compound include sodium bromide, potassium bromide, lithium bromide, and hydrobromic acid. The free-chlorine agent may be the same as that described in the section of the combined-chlorine slime-control agent.

It is suitable to use, as the stabilized-bromine slime-control agent used in the present invention, bromosulfamic acid or a bromosulfamate produced by reacting the bromine oxidizing agent with sulfamic acid or a sulfamate. Examples of the stabilized-bromine slime-control agent used in the present invention include "Orpersion E266 Series" produced by ORGANO CORPORATION and "STABREX" produced by Nalco.

The amount of active constituent (i.e., the constituent that serves as a slime-control agent) of the combined-chlorine slime-control agent and the stabilized-bromine slime-control agent used in the present invention can be detected and determined by measuring the concentration of residual halogen by a DPD method as total chlorine. The combined-chlorine slime-control agent and the stabilized-bromine slime-control agent used in the present invention may include a highly oxidative constituent (e.g., free halogens, such as free chlorine and free bromine) in a small amount. The amount of the highly oxidative constituent can be detected and determined by measuring free chlorine concentration by a DPD method.

In the present invention, the above-described stabilized-halogen slime-control agent, such as the chlorosulfamate slime-control agent or the bromosulfamate slime-control agent, is added to the RO feedwater such that the concentration of residual halogen (hereafter, the term "halogen" refers to chlorine and/or bromine) in the concentrate of the RO-membrane device which is to be introduced into the energy recovery device (hereafter, may be referred to as "the concentrate at the entrance of the energy recovery device") is 0.1 to 10000 mg/L or is preferably 0.1 to 100 mg/L as total chlorine.

If the residual halogen concentration in the concentrate at the entrance of the energy recovery device is lower than the above lower limit, the occurrence of biofouling in the energy recovery device may fail to be reduced to a sufficient degree. If the residual halogen concentration in the concentrate at the entrance of the energy recovery device is higher than the above upper limit, the quality of the permeate may be degraded. In addition, the chemical costs are increased unfavorably.

The addition of the stabilized-halogen slime-control agent may be done in a continuous or intermittent manner. In the case where the addition of the stabilized-halogen slime-control agent is done in an intermittent manner, although the conditions under which the intermittent addition of the stabilized-halogen slime-control agent is done are not limited, the addition of the stabilized-halogen slime-control agent is preferably done once in 0.5 to 14 days for about 1 to 12 hours.

The stabilized-halogen slime-control agent may be added to the water that is to be pretreated or to the RO feedwater on the entry side of the RO-membrane device. It is preferable to add the stabilized-halogen slime-control agent to the RO feedwater on the entry side of the RO-membrane device. It is particularly preferable to add the stabilized-halogen slime-control agent to the RO feedwater on the entry side of the high-pressure pump.

In order to prevent the degradation of the RO membrane, the free halogen concentration in the RO feedwater introduced into the RO-membrane device is preferably less than 0.05 mg/L (as free chlorine) as determined by the DPD method specified in JIS K0400-33-10:1999 or the like. In order to prevent the occurrence of biofouling, it is preferable to set the residual halogen concentration in the RO feedwater introduced into the RO-membrane device to 0.1 to 5000 mg/L as total chlorine, while controlling the residual halogen concentration in the concentrate at the entrance of the energy recovery device to fall within the above range.

FIG. 1 is a schematic system diagram illustrating a suitable example of an RO-membrane treatment system according to the present invention. In FIG. 1, 1 denotes a water tank; 2 denotes a filtering unit; 3 denotes an RO-membrane device; 4 denotes an energy recovery device; 5 denotes a residual halogen densitometer; 6 denotes a chemical injection pump for stabilized-halogen slime-control agent; 7 denotes a storage tank for stabilized-halogen slime-control agent; 8 denotes a chemical injection controller; and P denotes a high-pressure pump.

In the RO-membrane treatment system illustrated in FIG. 1, after NaClO has been added to water in the water tank 1, the water is introduced into the filtering unit 2 through a pipe 11 and filtered in the filtering unit 2. While the filtered water is pressure-fed to the RO-membrane device 3 through a pipe 12 with the high-pressure pump P, $NaHSO_3$ is added to the filtered water in order to remove residual chlorine by decomposition. Subsequently, the stabilized-halogen slime-control agent, such as the chlorosulfamate slime-control agent or the bromosulfamate slime-control agent, is added to the water, which is then introduced into the RO-membrane device 3. The stabilized-halogen slime-control agent is fed with the chemical injection pump 6 from the storage tank for stabilized-halogen slime-control agent 7 through a pipe 18 and added to the pipe 12 on the entry side of the high-pressure pump P.

The permeate of the RO-membrane device 3 is drawn through a pipe 13 as treated water, while the concentrate of the RO-membrane device 3 is introduced into the energy recovery device 4 through a pipe 14. After energy has been recovered from the concentrate in the energy recovery device 4, the concentrate is blown down to the outside of the system through a pipe 15. The energy recovery device illustrated in FIG. 1 is an energy recovery device that recovers the energy of the concentrate and reuses the energy for pressurization. Part of the pretreated water is introduced into the energy recovery device 4 through a pipe 16 and pressurized by the concentrate. The pressurized water is returned to the pipe 12 through a pipe 17 at a position upstream of the position at which the addition of $NaHSO_3$ is done.

The pipe 14 is provided with the residual halogen densitometer 5 disposed therein, with which the residual halogen concentration in the concentrate at the entrance of the energy recovery device is measured. Upon receiving the residual halogen concentration in the concentrate measured with the residual halogen densitometer 5, the chemical injection controller 8 sends a chemical-injection control signal to the chemical injection pump 6 in order to control the chemical injection of the stabilized-halogen slime-control agent such that the residual halogen concentration in the concentrate measured with the residual halogen densitometer 5 is 0.1 to 10000 mg/L as total chlorine.

The residual halogen densitometer used in the present invention for measuring the residual halogen concentration in the concentrate at the entrance of the energy recovery device is preferably a densitometer capable of measuring residual halogen as total chlorine. For example, a DPD method or a syringaldazine method may be used. The residual halogen densitometer is preferably disposed in the concentrate pipe in the vicinity of the concentrate inlet of the energy recovery device in order to measure the residual halogen concentration in the concentrate at a position immediately before the energy recovery device. It is preferable to arrange the residual halogen densitometer at, for example, a position 20 m or less or particularly 10 m or less from the concentrate inlet of the energy recovery device in the longitudinal direction of the pipe. Specifically, as described above, although the stabilized-halogen slime-control agent added to the RO feedwater is, in theory, concentrated in the RO-membrane device and the concentration of the stabilized-halogen slime-control agent in the concentrate is accordingly increased with the water recovery rate of the RO-membrane device, the stabilized-halogen slime-control agent added to the RO feedwater becomes decomposed by organic substances deposited on the surface of the RO membrane, organic substances contained in the feedwater, organic substances adhered to the feedwater pipe and the concentrate pipe, and a reductant, such as $NaHSO_3$, that remains in the feedwater, while the concentrate is introduced from the raw-water side portion of the RO-membrane device into the energy recovery device through the concentrate pipe. Therefore, measuring the residual halogen concentration in the concentrate in the concentrate pipe at a position distant from the concentrate inlet of the energy recovery device may result in failure to determine the accurate residual halogen concentration in the concentrate that is actually introduced into the energy recovery device, because the stabilized-halogen slime-control agent contained in the concentrate may become decomposed while the concentrate further passes through the concentrate pipe after the residual halogen concentration in the concentrate has been measured and the residual halogen concentration in the concentrate may be accordingly reduced. For the above reasons, it is preferable to arrange the residual halogen densitometer in the vicinity of the concentrate inlet of the energy recovery device and to measure the residual halogen concentration in the concentrate at a position immediately before the energy recovery device.

FIG. 1 a schematic system diagram illustrating an example of the RO-membrane treatment system according to the present invention, and the RO-membrane treatment system according to the present invention is not limited to that illustrated in FIG. 1. For example, the pretreatment device disposed upstream of the RO-membrane device may include, in addition to the filtering unit, various treatment units that perform a coagulation treatment and the like. The energy recovery device may be an energy recovery device that recovers the energy of the concentrate by converting the pressure of the concentrate into electric energy or the like.

EXAMPLES

The present invention is described more specifically with reference to Examples and Comparative examples below.

In Examples and Comparative examples below, the RO-membrane treatment system (reverse osmosis membrane treatment apparatus for seawater desalination used in power plants) illustrated in FIG. 1 was operated under the following conditions.

[Operation Conditions]
<RO-Membrane Device>
RO feedwater flow rate: 250 $m^3$/hr
Permeate flow rate: 100 $m^3$/hr
Water recovery rate: about 40%
<Energy Recovery Device>
Pressure-recovery energy recovery device Since the water recovery rate of the RO-membrane device was set to about 40% in Examples and Comparative examples below, in theory, the total chlorine concentration in the concentrate should be 1.7 times the total chlorine concentration in the RO feedwater. However, the total chlorine concentration in the concentrate may become lower than 1.7 times the total chlorine concentration in the RO feedwater, because the combined-chlorine slime-control agent added to the RO feedwater becomes decomposed by organic substances deposited on the surface of the RO membrane, organic substances adhered to the feedwater pipe and the concentrate pipe included in the RO membrane device, and $NaHSO_3$ that remain in the RO membrane device or the like.

Furthermore, the total chlorine concentration in the concentrate at the entrance of the energy recovery device varies in each case even when the amount of combined-chlorine slime-control agent added to the RO is the same (i.e., the total chlorine concentration in the feedwater is the same), because the qualities of seawater, the piping in the system, and the degree of contamination of the RO membrane slightly vary in each case.

For the above reasons, in Examples and Comparative examples below, the total chlorine concentration in the RO feedwater was measured with a total chlorine densitometer disposed in an RO-feedwater pipe at a position 2 m from the RO-feedwater inlet of the RO-membrane device. The total chlorine concentration in the concentrate at the entrance of the energy recovery device was measured with a total chlorine densitometer disposed in a concentrate pipe at a position 2 m from the concentrate inlet of the energy recovery device.

Comparative Example 1

NaClO was added to seawater in the water tank 1 in order to sterilize the seawater. Subsequently, NaHSO$_3$ was added to the seawater on the entry side of the high-pressure pump P in order to remove residual NaClO by reduction. The sterilized seawater was then fed to the RO-membrane device and subjected to the above RO-membrane treatment for one year. The annual average energy recovery rate of the energy recovery device (P$_1$/P$_2$×100, P$_2$: pressure at the entrance of the energy recovery device, P$_1$: pressure converted (recovered) by the energy recovery device) was 85%. The energy recovery device was stopped due to biofouling three times a year.

Hereafter, the annual average energy recovery rate of the energy recovery device is referred to simply as "energy recovery rate", and the number of times the energy recovery device was stopped due to biofouling in a year is referred to simply as "stop frequency".

Examples 1 and 2 and Comparative Examples 2 to 4

The RO-membrane treatment system was operated as in Comparative example 1, except that sodium monochlorosulfamate (NHClSO$_3$Na), which served as a combined-chlorine slime-control agent, was added to the RO feedwater in a continuous manner at a position that was on the entry side of the pump P and downstream of the position at which the addition of NaHSO$_3$ was done such that the total chlorine concentration in the RO feedwater was the specific one of the concentrations shown in Table 1. Table 1 shows the total chlorine concentration in the concentrate at the entrance of the energy recovery device and the energy recovery rate and stop frequency of the energy recovery device.

The sodium monochlorosulfamate used in Examples 1 and 2 and Comparative examples 2 to 4 was prepared by the method described in the section "Preparation of Chemicals Used in Tests" in Test example I below.

Example 3

The RO-membrane treatment system was operated as in Comparative example 1, except that sodium monochlorosulfamate was added to the RO feedwater at a concentration of 40 mg/L for 3 hours a day in an intermittent manner. Table 1 shows the total chlorine concentration in the concentrate at the entrance of the energy recovery device and the energy recovery rate and stop frequency of the energy recovery device.

Example 4

The RO-membrane treatment system was operated as in Comparative example 1, except that sodium monochlorosulfamate was added to the RO feedwater at a concentration of 5000 mg/L for 30 minutes a day in an intermittent manner. Table 1 shows the total chlorine concentration in the concentrate at the entrance of the energy recovery device and the energy recovery rate and stop frequency of the energy recovery device.

Comparative Examples 5 and 6

The RO-membrane treatment system was operated as in Comparative example 1, except that 5-chloro-2-methyl-4-isothiazoline-3-one (Cl-MIT), which served as organic microbicide, was added to the RO feedwater in a continuous manner at a position that was on the entry side of the pump P and downstream of the position at which the addition of NaHSO$_3$ was done such that the Cl-MIT concentration in the RO feedwater was the specific one of the concentrations shown in Table 1. Table 1 shows the total chlorine concentration in the concentrate at the entrance of the energy recovery device and the energy recovery rate and stop frequency of the energy recovery device.

TABLE 1

| | Chemical added | Addition method | Total chlorine concentration (mg/L: detected concentration) RO feedwater | Concentrate at entrance of energy recovery device | Energy recovery rate (%) | Stop frequency (time/year) | Evaluation |
|---|---|---|---|---|---|---|---|
| Comparative example 1 | — | — | — | — | 85 | 3 | x |
| Comparative example 2 | NHClSO$_3$Na | Continuous | 0.1 | 0 | 85 | 3 | x |
| Comparative example 3 | NHClSO$_3$Na | Continuous | 20 | 0 | 85 | 3 | x |
| Comparative example 4 | NHClSO$_3$Na | Continuous | 0.05 | 0.08 | 85 | 3 | x |
| Example 1 | NHClSO$_3$Na | Continuous | 0.1 | 0.2 | 94 | 1 | o |
| Example 2 | NHClSO$_3$Na | Continuous | 20 | 34 | 94 | 1 | o |
| Example 3 | NHClSO$_3$Na | Intermittent | 40 | 70 | 95 | 1 | o |
| Example 4 | NHClSO$_3$Na | Intermittent | 5000 | 10000 | 95 | 1 | o |
| Comparative example 5 | Cl-MIT | Continuous | 0.09* | 0 | 86 | 3 | x |
| Comparative example 6 | Cl-MIT | Continuous | 0.09* | 0.06* | 91 | 2 | x |

*Cl-MIT concentration

The results shown in Table 1 confirm the following facts.

In Comparative example 1, where NaHSO$_3$ was added to the RO feedwater on the entry side of the RO-membrane device subsequent to the addition of NaClO in order to remove residual NaClO by reduction, the energy recovery rate of the energy recovery device was 85% and the stop frequency of the energy recovery device was 3 time/year.

In Comparative examples 2 and 3, where sodium monochlorosulfamate was added to the RO feedwater but residual chlorine was not detected in the concentrate at the entrance of the energy recovery device, the energy recovery rate and stop frequency of the energy recovery device were at the same levels as in Comparative example 1, where sodium monochlorosulfamate was not added to the RO feedwater. That is, the energy recovery rate and stop frequency of the energy recovery device were not improved. In Comparative example 4, where residual chlorine was detected in the concentrate at the entrance of the energy recovery device but the total chlorine concentration in the concentrate was low, that is, 0.08 mg/L, the energy recovery rate and stop frequency of the energy recovery device were not improved.

In Comparative examples 5 and 6, an organic microbicide was used instead of sodium monochlorosulfamate that served as a combined-chlorine slime-control agent. In Comparative example 5, where residual chlorine was not detected in the concentrate at the entrance of the energy recovery device, the energy recovery rate and stop frequency of the energy recovery device were substantially at the same levels as in Comparative example 1. In Comparative example 6, where the total chlorine concentration in the concentrate at the entrance of the energy recovery device was 2 mg/L, the energy recovery rate and stop frequency of the energy recovery device were improved compared with those measured in Comparative example 1, but still at insufficient levels. Specifically, since an organic microbicide is unstable and does not have a peeling effect against biofouling in the neutral range, the advantageous effects similar to those of the combined-chlorine slime-control agent are not achieved.

In contrast, in Examples 1 to 4, where a combined-chlorine slime-control agent was added to the feedwater such that the total chlorine concentration in the concentrate at the entrance of the energy recovery device fell within the range specified in the present invention, the energy recovery rate of the energy recovery device was markedly increased and the stop frequency of the energy recovery device was also markedly reduced to 1 time/year, regardless whether the addition of the combined-chlorine slime-control agent was done in a continuous or intermittent manner.

Test Example I

A test for confirming the capabilities of a combined-chlorine slime-control agent and a stabilized-bromine slime-control agent to reduce the adhesion of slime to the energy recovery device was conducted.

1. Preparation of Chemicals Used in Tests

Sodium monochlorosulfamate and a bromosulfamate were prepared by the following methods.

1-1. Preparation of Sodium Monochlorosulfamate

In 67 parts by weight of pure water, 193 parts by weight of a 48-weight % aqueous sodium hydroxide solution was dissolved. In the resulting solution, 120 parts by weight of sulfamic acid was dissolved. Subsequently, 600 parts by weight of an aqueous sodium hypochlorite solution having an available chlorine concentration of 12% by weight as $Cl_2$ was dissolved in the solution. Hereby, an aqueous sodium monochlorosulfamate solution was prepared.

1-2. Preparation of Bromosulfamate

In a nitrogen atmosphere, 361 parts by weight of sodium hydroxide was mixed with 1453 parts by weight of pure water. With the resulting mixture, 300 parts by weight of sulfamic acid was mixed. Subsequently, 456 parts by weight of liquid bromine was added to the mixture. Then, 230 parts by weight of a 48-weight % aqueous potassium hydroxide solution was dissolved in the mixture. Hereby, an aqueous bromosulfamate solution was prepared.

2. Test Method 2-1. Test Water

Water produced by treating wastewater from Kurita Global Technology Center of Kurita Water Industries Ltd. was used as test water.

2-2. Chemicals

The chemicals prepared in Preparation of Chemicals Used in Tests were used.

Chemical-1: Combined-chlorine slime-control agent (sodium monochlorosulfamate)

Chemical-2: Stabilized-bromine slime-control agent (bromosulfamate)

2-3. Testing Apparatus

The testing apparatus illustrated in FIG. 2 was used.

In the testing apparatus, the test water fed from a pipe 20 is split into pipes 21, 22, and 23 and passed through columns 31, 32, and 33 provided with test pieces 31a, 32a, and 33a (3 cm×5 cm test pieces made of SUS316L) fixed to the respective inner walls. $FI_1$, $FI_2$, and $FI_3$ represent a flow meter. $V_1$, $V_2$, and $V_3$ represent a valve.

A pipe 22A through which the chemical-1 is injected is connected to the branch pipe 22. A pipe 23A through which the chemical-2 is injected is connected to the branch pipe 23.

2-4. Measuring Method

The test water was passed into the columns 31 to 33 through the branch pipes 21 to 23 at a flow rate of 1.7 L/min for 13 days. While the test water was passed through the testing apparatus, the chemical-1 was injected into the pipe 22 such that the total chlorine concentration measured by the DPD method produced by HACH was 1.0 mg/L (Test No. 2), and the chemical-2 was injected into the pipe 23 such that the total chlorine concentration measured by the same method as in Test No. 2 was 0.8 mg/L (Test No. 3). No chemical (no treatment) was added to the pipe 21 (Test No. 1).

After the test water had been passed through the testing apparatus for 13 days, the test pieces 31a to 33a were removed, and the microorganisms adhered on the surfaces thereof were sampled. The amount of microorganisms adhered on the surface of each of the test pieces was measured with a "Lumitester C-110" produced by Kikkoman Biochemifa Company. The amount of microorganisms was measured as ATP and expressed in the unit of $pg/cm^2$.

2-5. Test Results

Table 2 shows the test results.

TABLE 2

| No. | Chemical added | Chemical addition concentration as total chlorine (mg/L) | Amount of microorganisms adhered (ATP $pg/cm^2$) |
|---|---|---|---|
| 1 | No treatment | 0 | 121 |
| 2 | Chemical-1 (combined-chlorine slime-control agent) | 1.0 | 49 |
| 3 | Chemical-2 (stabilized-bromine slime-control agent) | 0.8 | 72 |

As is clear from the results shown in Table 2, the combined-chlorine slime-control agent (sodium monochlorosulfamate) and the stabilized-bromine slime-control agent (bromosulfamate) both reduced the adhesion of microorganisms compared with the case where no treatment was performed.

Although the present invention has been described in detail with reference to a particular embodiment, it is apparent to a person skilled in the art that various modifications can be made therein without departing from the spirit and scope of the present invention.

The present application is based on Japanese Patent Application No. 2015-72956 filed on Mar. 31, 2015, which is incorporated herein by reference in its entirety.

REFERENCE SIGNS LIST

1 WATER TANK
2 FILTERING UNIT
3 RO-MEMBRANE DEVICE
4 ENERGY RECOVERY DEVICE
5 RESIDUAL HALOGEN DENSITOMETER
6 CHEMICAL INJECTION PUMP
7 STORAGE TANK FOR STABILIZED-HALOGEN SLIME-CONTROL AGENT
8 CHEMICAL INJECTION CONTROLLER

The invention claimed is:

1. A method for operating a reverse-osmosis-membrane treatment system including a reverse-osmosis-membrane device and an energy recovery device into which a concentrate of the reverse-osmosis-membrane device is introduced, the method comprising:
   treating, at first, water with NaClO;
   sending a part of the treated water to the energy recovery device, rising a pressure of the part of the water with an energy recovered at the energy recovery device, and returning the part of the water to combine with the treated water;
   adding a combined chlorine agent comprising a free-chlorine agent and a sulfamic acid compound to the treated water and the part of the water;
   sending the treated water and the part of the water to the reverse-osmosis-membrane device through a pump different from the energy recovery device;
   removing a permeate water from the reverse-osmosis-membrane device as a treated water;
   sending the concentrate of the reverse-osmosis-membrane device to the energy recovery device to rise the pressure of the part of the water at the energy recovery device; and
   discharging the concentrate from which energy was recovered in the energy recovery device out of the reverse-osmosis-membrane treatment system;
   wherein a residual halogen concentration in the concentrate that is to be introduced into the energy recovery device becomes 0.1 to 10000 mg/L as total chlorine to thereby reduce occurrence of biofouling in the energy recovery device and increase energy recovery rate at the energy recovery device, and
   the reverse-osmosis-membrane treatment system is a system that desalinates seawater.

2. The method for operating a reverse-osmosis-membrane treatment system according to claim 1, wherein the combined chlorine agent is added such that the residual halogen concentration in the concentrate that is to be introduced into the energy recovery device becomes 0.2 to 34 mg/L as total chlorine.

3. The method for operating a reverse-osmosis-membrane treatment system according to claim 1, further comprising adding a composition that decomposes and removes residual chlorine in the water in an upstream side where the combined chlorine agent is added.

4. The method for operating a reverse-osmosis-membrane treatment system according to claim 3, wherein the composition is $NaHSO_3$.

5. The method for operating a reverse-osmosis-membrane treatment system according to claim 1, further comprising
   measuring the residual halogen concentration of the concentrate before the energy recovery device and after the reverse-osmosis-membrane device; and
   adding the combined chlorine agent so that the residual halogen concentration in the concentrate introduced into the energy recovery device becomes 0.1 to 10000 mg/L.

6. The method for operating a reverse-osmosis-membrane treatment system according to claim 1, wherein the reverse-osmosis-membrane treatment system includes one reverse-osmosis-membrane device so that the concentrate passing through the one reverse-osmosis-membrane device is sent to the energy recovery device to provide energy to the part of the water which is sent to the one reverse-osmosis-membrane device.

* * * * *